July 24, 1951  B. H. WOJCIK ET AL  2,562,159
PRODUCTION OF XYLENE HEXAFLUORIDE
Filed Nov. 30, 1944
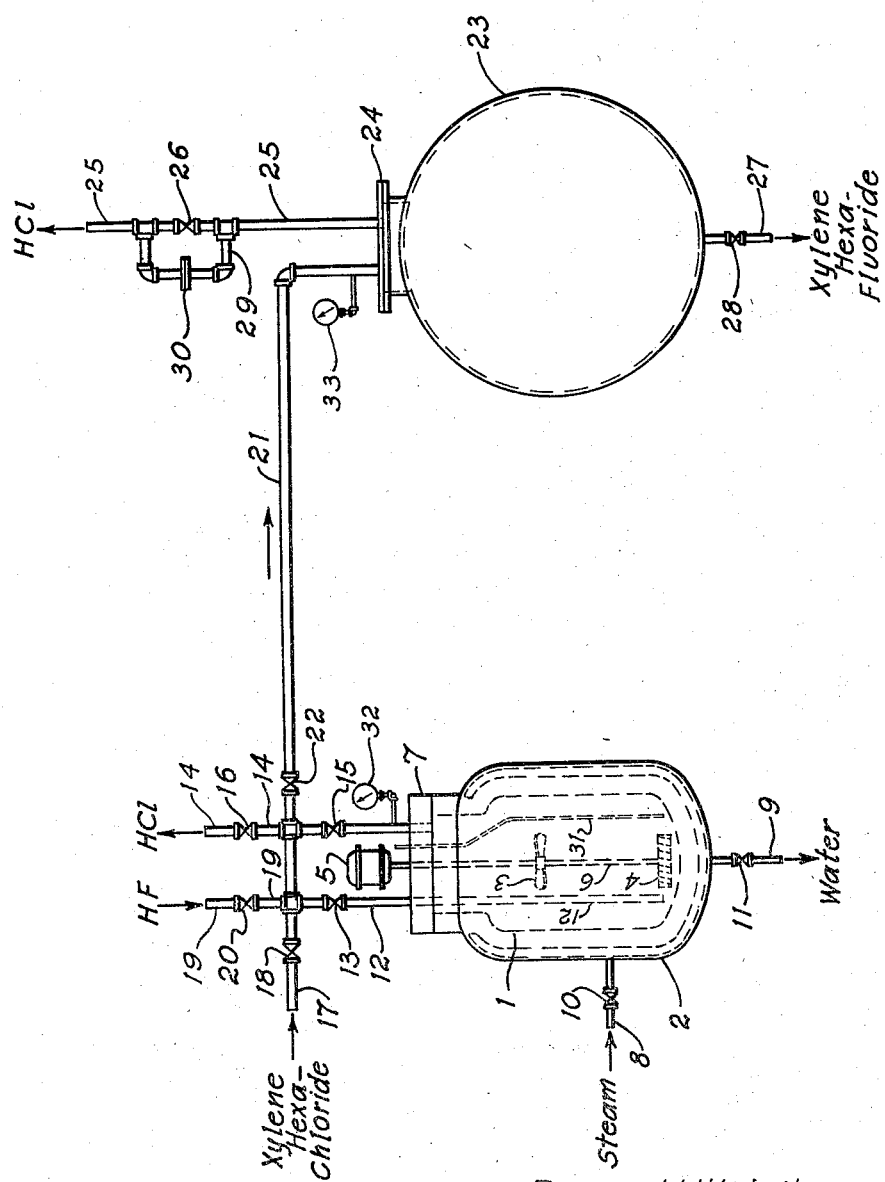
Bruno H. Wojcik
Aylmer H. Maude
INVENTORS
BY

Patented July 24, 1951

2,562,159

UNITED STATES PATENT OFFICE 2,562,159

PRODUCTION OF XYLENE HEXAFLUORIDE

Bruno H. Wojcik and Aylmer H. Maude, Niagara Falls, N. Y., assignors to the United States of America as represented by the United States Atomic Energy Commission Application November 30, 1944, Serial No. 565,998

1 Claim. (Cl. 260—651)

The present invention relates to a process for removing volatile liquid products from reaction vessels, such as autoclaves, under pressures of the order of 1,000 lbs. per sq. in. or more, and more particularly to a process for removing such products from the reaction vessels when there is also a gaseous by-product or an excess of a gaseous reagent. Examples of such reactions are halogenation of certain hydrocarbons and in particular the substitution of elemental fluorine or fluorine derived from hydrogen fluoride for chlorine in chlorinated hydrocarbons.

We will describe our invention as applied to the substitution of fluorine for chlorine in xylene hexachloride, but it is to be understood that this is merely illustrative, and that our invention is equally applicable wherever high pressures are involved and there is a volatile liquid product.

In the production of xylene hexafluoride, xylene hexachloride is reacted with hydrogen fluoride in an autoclave at pressures of up to about 1600 lbs. per sq. in. In this reaction the hydrogen fluoride is replaced by an approximately equal volume of hydrogen chloride which accumulates in the gas space above the liquid. The xyene hexachloride and liquid hydrogen fluoride are charged into the autoclave, which is then sealed. The reaction mixture is agitated, and heat is applied to raise the temperature. At 50° C. the reaction starts. The agitation and supply of external heat are continued until the temperature has reached 110° C., by which time the pressure has been built up to about 1600 lbs. per sq. in. The temperature is maintained at about 110° C. for about two hours, with continued agitation, and supply of heat as may be necessary to maintain the temperature. During this time the fluorine of the hydrogen fluoride is replacing chlorine and at the conclusion of the operation the gas space in the autoclave is filled with hydrogen chloride, mixed with a small excess of hydrogen fluoride. In an autoclave of fifteen cubic feet capacity in which 525 lbs. of xylene hexachloride and 300 lbs. of HF have been reacted together to form to xylene hexafluoride and HCl, the gases may have a volume of 3600 cubic feet at atmospheric pressure. Before the product can be removed from the autoclave it is desirable to vent off these gases. Xylene hexafluoride boils at 113° C. to 117° C. and has a relatively high vapor pressure. In the autoclave it is moreover saturated with the gases. If the gases were to be vented off suddenly they would carry with them a considerable proportion of the product. It has therefore been found desirable to vent off the gases slowly, allowing ten to twelve hours for the operation. During this time the autoclave and its accessories are of course unavailable for starting the next batch. The time required for the reaction itself, including the admission of hydrogen fluoride, is two to three hours. The venting off of the gases therefore requires 80 per cent of the time of the complete cycle and reduces the effective capacity of the expensive equipment involved to a corresponding extent.

We have now found that it is possible to increase the effective capacity of the autoclave equipment by about 500 per cent by transferring its liquid and gaseous contents quickly to a large but relatively inexpensive low pressure receiver, from which the gases may be vented in three quarters of an hour to one hour. In carrying out this operation with an autoclave of fifteen cubic feet capacity we prefer to use a receiver of about seventy-five cubic feet capacity, having an interconnection, such as a pipe, communicating with the gas spaces of the autoclave and receiver and also with a well pipe extending to near the bottom of the autoclave. We preferably first allow the gases to blow over until the pressure in the autoclave has fallen to about 400 lbs. per sq. in. and a pressure of about 30 lbs. per sq. in. has been built up in the receiver. We then allow the liquid product to blow over through the well pipe. When the liquid falls to the mouth of the well pipe the gas follows it and the pressures become equalized in the autoclave and receiver, at about 30 to 35 lbs. per sq. in. The residual gas is quickly vented from the autoclave and within fifteen to thirty minutes it is recharged and ready for the next cycle. Meanwhile, the gases are being vented slowly from the receiver; after which the liquid product is withdrawn therefrom. If desired, the receiver may be provided with a restricted vent, which can be left open while the product is being transferred from the autoclave. The purpose of this is to permit the venting of the receiver to be proceeding while the gases are passing over into it, thus reducing the subsequent time of venting the receiver.

If preferred, the gases and liquid may be transferred from the autoclave to the receiver in two or more alternations of gas and liquid; or the transfer of the liquid may precede the transfer of the gas. The blowing down of the gases from the receiver requires three quarters of an hour to one hour. One receiver may therefore serve for several autoclaves. Thus by a relatively small investment in a blow-down receiver we are able to increase the effective capacity of an installation of expensive autoclaves by five hundred per cent.

A slightly improved yield in respect of the conversion from hexachloride to hexafluoride is obtained if while the gases are being vented to the receiver, heat is supplied to raise the temperature of the material in the autoclave as may be necessary to maintain the pressure at 1600 lbs. per sq. in. and this is continued until the temperature has reached 140° C. after which the pressure may be allowed to fall as the gases pass over.

The attached drawing illustrates diagrammatically a suitable form of apparatus for carrying out the process of the invention.

1 is the autoclave, provided with jacket 2, a propeller type agitator 3 and a turbine type agitator 4, driven by motor 5 by means of shaft 6, which issues through a pressure tight stuffing box (not shown) in cover 7. Jacket 2 is provided with a steam connection 8 and water drawoff 9, controlled by valves 10 and 11 respectively. Autoclave 1 is also provided with a well pipe 12, controlled by valve 13, extending through cover 7 to near the bottom of the autoclave, and with a vent pipe 14, controlled by valves 15 and 16, communicating with its interior through cover 7. Pipe 17, controlled by valve 18, is connected to pipe 12 for admission of xylene hexachloride, from a source not shown. Pipe 19, controlled by valve 20, is connected to pipe 12 for admission of hydrofluoric acid from a source not shown. Pipe 21, controlled by valve 22, is connected to both pipes 12 and 14 for transfer of liquid and gaseous products respectively to receiver 23, with which it communicates through its cover 24. Receiver 23 is provided with vent 25, controlled by valve 26, and bottom draw off 27, controlled by valve 28. Vents 14 and 25 are connected to an absorption system for HCl (not shown). Valve 26 may be by-passed by pipe 29, provided with a restricted orifice in plate 30. Thermocouple 31 is let in through cover 7 to the interior of the autoclave. Pressure gauge 32 is connected to pipe 14 and pressure gauge 33 to pipe 21.

With valves 13, 15 and 16 open and valves 20 and 22 closed, a weighed quantity of xylene hexachloride is charged into autoclave 1 through valve 18 and pipe 12, so as to leave an adequate gas space above the liquid. With valves 15 and 16 closed, and with the agitator operating, hydrofluoric acid is admitted below the surface of the liquid through pipes 19 and 12 and valves 20 and 13. Steam is then admitted to the jacket. When the temperature of the liquid has reached 50° C., as shown by thermocouple 31, the reaction begins. With the heat of reaction, augmented by heat from the jacket, the temperature continues to rise. When it has reached 110° C., it is held constant at that temperature by control of the steam in the jacket. At this temperature the pressure builds up to 1600 lbs. per sq. in., as indicated by gauge 32. The reaction is thus caused to proceed as above described. At the conclusion of the reaction, with all other valves controlling receiver 23 closed, valves 15 and 22 are opened, permitting the by-product HCl to flow into the receiver through pipe 21, until the pressure in the autoclave has fallen to about 400 lbs. per sq. in., the corresponding pressure in receiver 23, as indicated by gauge 33, being about 30 lbs. per sq. in. Valve 15 is then closed and valve 13 opened, causing the liquid to be transferred to the receiver. When the last of the liquid has passed over, the residual gas pressure in the autoclave is relieved through the same pipe 12, thus equalizing the pressure in the autoclave and receiver. Valve 22 is then closed and the comparatively small quantity of gas in the autoclave quickly vented to the absorption system through pipe 14 and valves 15 and 16; after which the autoclave is recharged for the next batch. In the meantime gas has been venting to the absorption system through the orifice plate 30, and this is allowed to continue until the pressure in the receiver has dropped nearly to atmospheric, when valve 26 may be opened. The product is then drawn off through pipe 27.

Although the present invention has been described with reference to preferred embodiments and examples, it will be understood that variations and modifications may be made therein and equivalents substituted therefor without departing from the spirit of the invention.

We claim as our invention:

In a method for producing xylene hexafluoride and hydrogen chloride by the reaction of hydrogen fluoride upon xylene hexachloride in an autoclave under attained pressures of at least 1000 pounds per square inch, the process of rapidly removing the liquid xylene hexafluoride from the autoclave without losing considerable amounts of liquid xylene hexafluoride by entrainment with the gaseous hydrogen chloride which comprises venting gaseous hydrogen chloride from the top of said autoclave to a receiver having a volume about five times the volume of said autoclave until the gas pressure in said autoclave has been reduced to about one quarter of its attained value, utilizing the residual gas pressure in the autoclave to blow the liquid xylene hexafluoride from near the bottom of the autoclave upward into a well pipe and over into said receiver, bleeding gaseous hydrogen chloride from said autoclave to said receiver after the liquid xylene hexafluoride has been blown over into said receiver until the gas pressures in said autoclave and said receiver become equal, shutting off the fluid connection between said autoclave and said receiver, separately and quickly venting the remaining gaseous hydrogen chloride from said autoclave, slowly venting the gaseous hydrogen chloride from said receiver while said autoclave is being recharged, and withdrawing liquid xylene hexafluoride from the bottom of said receiver after substantially all of the gaseous hydrogen chloride has been vented therefrom.

BRUNO H. WOJCIK.
AYLMER H. MAUDE.

REFERENCES CITED

The following references are of record in the file of this patent:

UNITED STATES PATENTS

| Number | Name | Date |
|---|---|---|
| 1,255,018 | Jones | Jan. 29, 1918 |
| 2,038,564 | Hetherington | Apr. 28, 1936 |
| 2,156,234 | Bays | Apr. 25, 1939 |
| 2,245,028 | Farris | June 10, 1941 |
| 2,315,847 | Garretson | Apr. 6, 1943 |
| 2,381,405 | Griswold, Jr. | Aug. 7, 1945 |
| 2,391,727 | McConica | Dec. 25, 1945 |

FOREIGN PATENTS

| Number | Country | Date |
|---|---|---|
| 395,227 | Great Britain | July 13, 1933 |
| 647,998 | Germany | July 19, 1937 |